United States Patent [19]

Zobens

[11] 4,174,844
[45] Nov. 20, 1979

[54] MECHANICAL SEAL

[75] Inventor: Arthur Zobens, Mount Prospect, Ill.

[73] Assignee: Crane Packing Company, Morton Grove, Ill.

[21] Appl. No.: 637,975

[22] Filed: Dec. 5, 1975

[51] Int. Cl.² ............................................. F16J 15/38
[52] U.S. Cl. ..................................... 277/85; 277/96.2; 277/181
[58] Field of Search ........... 277/85, 129, 181, DIG. 6, 277/96 B, 81 R, 9, 96.2, 96

[56] References Cited

U.S. PATENT DOCUMENTS

| | | | |
|---|---|---|---|
| 1,168,687 | 1/1916 | Titus | 277/129 |
| 1,511,529 | 10/1924 | Standlee | 277/129 |
| 1,944,398 | 1/1934 | Bickerstaff | 277/129 |
| 3,101,200 | 8/1963 | Tracy | 277/81 R |
| 3,155,393 | 11/1964 | Hummer | 277/85 |

Primary Examiner—Lenard A. Footland
Attorney, Agent, or Firm—Dorsey L. Baker

[57] ABSTRACT

A mechanical face seal for application in high pressure sealing environments having a carbon sealing ring in sliding sealing contact with a sealing ring of dissimilar material. The carbon ring is supported on a rigid backing ring. A barrier is provided in overlying relation to the outer circumferential surface of the carbon ring to separate the outer circumferential surface from exposure to the pressure exerted by the sealed fluid.

8 Claims, 1 Drawing Figure

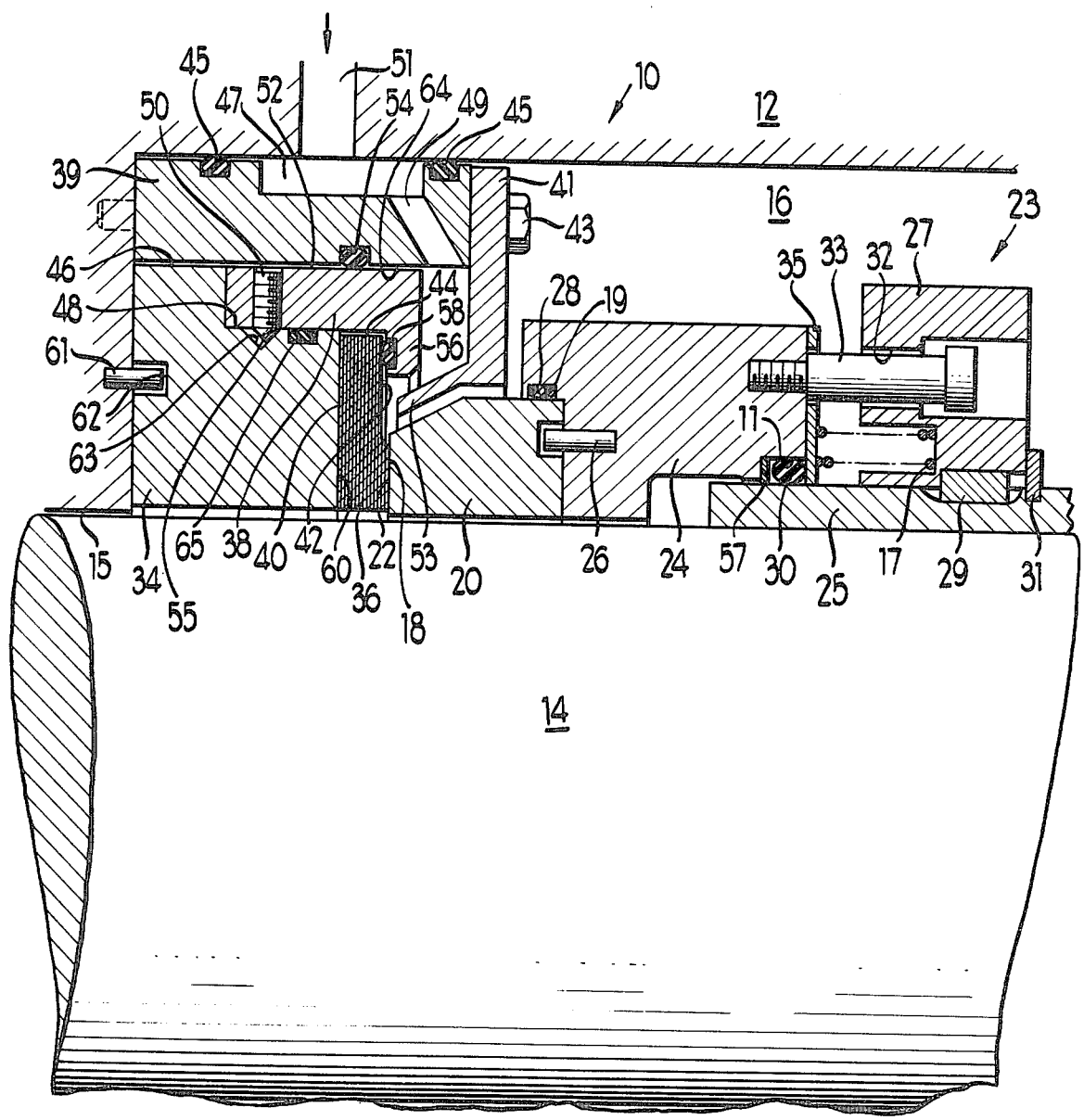

MECHANICAL SEAL

BACKGROUND OF THE INVENTION

This invention relates to rotary mechanical seals of the face type. More particularly it relates to face type mechanical seals utilizing a carbon ring as one of the running sealing faces.

Face type seals are commonly used to provide an essentially fluid tight seal between a housing and a relatively rotating shaft. They find wide application in relatively adverse sealing environments which include high fluid pressures and elevated operating temperatures. Typical applications are water pumps and coolant pumps utilized in nuclear power generation installations. In these latter usages, operating pressures often exceed 2,000 psi. Temperatures of the liquid sealed ranging from 250° F. to 290° F. are not uncommon. Temperatures at the seal itself are maintained at or below 180° F. by circulating quantities of the sealed fluid which have been cooled to the seal area.

Mechanical face seals include two rings pressed together axially, one associated with the stationary housing and one associated with the rotating shaft which are maintained resiliently in sliding sealing contact to prevent leakage of the sealed fluid even after some wear of the sliding faces. It has been well known that use of dissimilar materials to form the sealing rings provides significant advantages in minimization of sliding friction primarily by eliminating spalling of the sliding faces. One common material used for one of the rings is carbon. A variety of other materials may be used to form the cooperating sealing ring. These include steel, ceramic and tungsten carbide.

Use of carbon seal rings in applications which present extremes in terms of fluid pressure has met only limited success. Carbon does not possess sufficient structural rigidity to withstand the differential pressure between the sealed fluid and the exterior of the sealed chamber without considerable distortion. The sealed fluid exerts pressure upon the outer circumferential surface of the carbon seal ring, while the inner annular surface of the carbon ring is exposed to essentially atmospheric pressure. The differential pressure thus produced across the ring causes distortion of the carbon seal ring and its sliding face with a resultant premature failing of the seal.

Use of heavy or large size carbon rings capable of withstanding the high operating pressures has not proven successful. It is difficult to produce a carbon ring of large cross-section which is homogeneous in make-up. These rings have been found to have high internal residual stresses. Both factors contribute to uneven distortion, poor wear characteristics and unsatisfactory seal life.

This invention is directed to elimination of the problems associated with distortion of the carbon sealing ring due to exposure to excessive differential pressure. By this invention the outer circumferential surface of the ring is protected from exposure to the pressure of the sealed fluid. In this way the advantage of utilization of carbon material on one of the sealing faces is rendered available even in extreme pressure applications.

SUMMARY OF THE INVENTION

Very generally the present invention provides an improved form of mechanical face seal which utilizes a carbon ring to define one seal face and which employs means protecting the outer circumferential surface of the seal ring from exposure to the pressure exerted by the sealed fluid. The carbon seal ring defining the seal face is supported upon a rigid back-up ring. A rigid annular retainer overlies the entire outer circumferential extent of the carbon ring. The retainer seals the outer circumferential surface of the carbon ring from exposure to the pressure of the sealed fluid.

The back-up ring is formed of a material which possesses sufficient structural strength to support the carbon ring against deflection. Therefore, a carbon ring of minimal axial thickness may be used.

DESCRIPTION OF THE DRAWINGS

The single FIGURE of the drawing is a fragmentary sectional elevational view of a mechanical face seal embodying the principles of the present invention.

DETAILED DESCRIPTION

The embodiment of the invention illustrated in the drawing includes a mechanical face seal assembly generally designated 10 disposed in sealing relation between a stationary housing 12 and a relatively rotating shaft 14 passing through an opening 15 in housing 12. The seal assembly provides an essentially fluid tight seal between the interior of the housing designated 16 and the exterior of shaft 14. It is contemplated that housing 12 represents a pump housing or the like which is formed with a chamber 16 adjacent opening 15, said chamber 16 containing a fluid under pressure when the pump is in operation. Such fluid may be a coolant circulated in a nuclear power generating station or the like. It is contemplated that the fluid exists at elevated pressures for example exceeding 2,000 psi. and operating temperatures for example in the range up to 180° F. at the seal.

The rotary portion of the seal assembly 10 includes an annular sealing ring 20 made of steel or tungsten carbide. This ring has formed thereon a radially disposed annular sealing surface 22.

The ring 20 is supported by a carrier ring 24 which is operatively associated with the shaft 14 in a manner to cause the rings 24 and 20 to be driven by, and to rotate with, shaft 14 during operation. This driving relationship is accomplished in the preferred form illustrated herein by pins 26 which drivingly connect rings 20 and 24.

A drive means 23 connects shaft 14 and ring 24 to provide a driving relationship therebetween. The drive means 23 includes a sleeve 25 mounted on shaft 14 by an interference press fit so as to be driven thereby. A driven ring 27 surrounds sleeve 25 and is connected in driven relation to said sleeve 25 by a key 29. Axial movement of driven ring 27 to the right as viewed in the drawing is prevented by a snap ring 31.

Carrier ring 24 is secured to driven ring 27 by a series of shoulder bolts 33 which pass through appropriately formed axially extending openings 32 in said ring 27. These bolts provide a rotational driving connection between carrier ring 24 and driven ring 27 and also permit axial movement of shoulder bolts 33 relative to ring 27.

An annular plate or washer 35 is disposed against the radially disposed surface of carrier ring 24 which faces drive ring 27. The annular sealing ring 20 and its associated carrier ring 24 are adapted for limited axial movement with shoulder bolts 33 along the shaft 14. A plurality of axially directed biasing springs 17 are positioned about the periphery of the shaft 14 and bear against plate 35 to urge ring 20 toward the left as viewed in the drawing and against the cooperating sealing face 18 of the stationary portion of the seal assembly to be hereinafter described.

Carrier ring 24 is provided with a radially inwardly directed groove 19 adjacent rotary seal ring 20. An "O" ring seal 28 is disposed within groove 19 to provide a fluid tight seal between seal ring 20 and carrier ring 24 and also to give radial support to said seal ring 20.

Carrier ring 24 further includes an annular counterbore 11 adjacent plate 35 in which an "O" ring seal 30 is disposed to provide a fluid tight seal between carrier ring 24 and sleeve 25. An anti-extrusion ring or washer 57 preferably made of polytetrafluoroethylene is disposed at the bottom of counterbore 11.

The stationary portion of the seal assembly 10 is comprised of five major components, viz, a back-up ring 34, a carbon seal ring 36, a retainer or barrier means 38, a mounting ring 39 and a fluid deflector 41.

Mounting ring 39 surrounds back-up ring 34 and is secured to housing 12, or to an end plate (not shown) forming a part of housing 12, by a plurality of bolts 43. It includes a pair of grooves upon its outer circumferential surface within which are disposed "O" ring seals 45. These seals provide a fluid tight seal between the housing 12 and the mounting ring 39.

Mounting ring 39 further includes a relatively large groove 47 about its outer cylindrical surface which defines with the housing 12 an annular passage surrounding the mounting ring intermediate "O" ring seals 45. A plurality of passages 49 connect groove 47 with that portion of chamber 16 which is intermediate deflector 41 and retainer 38. Housing 12 has a passage 51 through which cooled sealed fluid under higher pressure than the pressure in chamber 16 may be introduced into the groove 47.

The sealed fluid is directed against deflector 41 and then into the seal area adjacent the stationary and rotary sealing elements through the passage 51, groove 47 and passages 49. The fluid is precooled to a temperature significantly lower than the operating temperature of the fluid within the housing. For example, the precooled fluid may be introduced into the seal area at from 120° F. to 160° F., while the fluid being sealed is operating at from 250° F. to 290° F.

The deflector 41 is connected to the mounting ring 39 by the same bolts 43 which secure mounting ring 39 to housing 12. Deflector 41 includes a conical fin 53 which is shaped to direct the fluid from passages 49 toward the relatively rotating sealing members to provide efficient cooling of the relatively rotating sealing faces.

Carbon seal ring 36 is in the form of an annular wafer of carbon material of relatively thin axial cross-section. It is sufficiently thin to be made homogeneously and without undesirable internal residual stresses.

The carbon seal ring 36 has a radially directed annular support surface 40 on one side in supporting contact with back-up ring 34. It also has a similarly radially directed annular surface 42 on its opposite side upon which there is provided a slightly raised seal face 18 in sliding sealing engagement with surface 22 of annular seal ring 20. The outer circumferential or peripheral surface 44 of seal ring 36 is generally cylindrical and connects the surfaces 40 and 42.

Back-up ring 34 is preferably formed of rigid material such as steel. It includes a radial surface 60 in supporting face-to-face contact with the support surface 40 of the carbon ring. Preferably both surfaces 60 and 40 are made perfectly flat by lapping or other finishing process. This insures that there are no distortions in surface 60 to be transferred through seal ring 36 to its sealing surface 18. Back-up ring 34 is sufficiently rigid to support carbon seal ring 36 against distortion or axial deflection due to the pressure of the pumped fluid.

Back-up ring 34 has an outer surface 46 of a diameter larger than the outer diameter of the carbon seal ring 36. This outer surface 46 is disposed within mounting ring 39. Back-up ring 34 is retained against rotation in the housing by pins 61 fixed to housing 12 and extending into recesses 62 in back-up ring 34. Said back-up ring 34 further includes an annular relief or reduction in diameter generally designated 48 formed in outer surface 46. This relief 48 is of a diameter slightly larger than the diameter of the outer peripheral surface 44 of carbon ring 36.

The retainer or barrier member 38 has a generally angle-shaped cross-section and is supported on the back-up ring 34 at the relief 48. A plurality of set screws 50 are provided which secure retainer 38 to the back-up ring 34. Generally three such set screws may be used located 120° apart. These set screws include tapered points 55 which engage a complimentary and deeper tapered peripheral groove 63 formed in the outer peripheral surface of back-up ring 34. The tapers on the points and in the groove co-act to provide an axial force on the retainer 38 urging it toward the back-up ring 34.

An outer circumferential surface 52 of retainer 38 is approximately the same diameter as outer surface 46 of back-up ring 34. It is received within the interior cylindrical surface 64 of the mounting ring 39 in the same manner as the back-up ring 34. An "O" ring seal 54 is provided between the mounting ring 39 and retainer 38 to insure a fluid tight seal between these adjacent surfaces. Similarly an "O" ring seal 65 is provided between the retainer and back-up ring 34.

In accordance with the principles of the present invention, the retainer 38 includes an annular portion which extends outwardly of the relief 48 in complete overlying relation to the outer cylindrical surface 44 of the carbon seal ring 36. A flange 56 of the retainer 38 extends radially inwardly to overlie a portion of the radial surface 42 of the carbon ring. An "O" ring seal 58 is interposed between the flange 56 and surface 42 of carbon seal ring 36 to prevent ingress of pressurized fluid to the outer cylindrical surface 44 of carbon seal ring 36. This "O" ring 58 presses sealing ring 36 against back-up ring 34 at the surfaces 40 and 60. The pressure of said "O" ring seal 58 is derived from the axial force exerted upon the retainer 38 by the engagement of the tapered points 55 of the screws 50 with the co-acting tapered groove 63 in back-up ring 34 which causes flange 56 to clamp "O" ring 58 against the thin carbon seal ring 36 and urge it against the support surface 40.

The outer circumferential surface 44 of the carbon seal ring 36 is completely protected against exposure to the pressure of the fluid within the pump chamber 16. Only the radial surface 42 of carbon seal ring 36 is exposed to the pressurized fluid within the housing 12, hence essentially all forces imparted to the carbon seal ring 36 are axial. These axial forces are readily accommodated by the rigid back-up ring 34, and the only radial forces acting on the sealing ring are those acting upon the outer peripheral surface of the raised sealing face of the radially directed surface 42. This is considered negligible and readily accommodated by the radial rigidity of the carbon sealing ring 36.

The above described arrangement allows for use of a thin homogeneous carbon seal ring without undesirable distortion even in extreme pressure operating environments.

Various features of the present invention have been shown and described. However, it should be noted that numerous modifications may be made without departing from the spirit and scope of the invention.

What is claimed is:

1. In a face type rotary mechanical seal having a pair of sealing members in relatively rotating sealing engagement, a sealing member comprising:
    (a) a generally annular sealing ring formed of carbon material defining a sealing face for a relatively rotating sealing engagement with the other sealing member, said carbon sealing ring having an outer peripheral surface and at least one generally radially directed annular support surface spaced from said sealing face;
    (b) a generally annular rigid back-up ring having a generally radially directed annular support surface in supporting contact with said support surface of said sealing ring; and
    (c) means defining a pressure barrier overlying the outer peripheral surface of said carbon sealing ring to separate said outer peripheral surface from the fluid to be sealed; and
    (d) wherein said barrier defining means comprises a rigid generally annular retainer secured to said rigid back-up ring, said retainer including a portion overlying said outer peripheral surface of said sealing ring, and means providing a fluid tight seal between said retainer and said carbon seal ring to prevent entry of sealed fluid therebetween.

2. In a face type rotary mechanical seal, a sealing member as claimed in claim 1, wherein said generally annular sealing ring formed of carbon material includes a generally radially directed annular surface spaced from said support surface, said retainer includes a generally radially inwardly directed flange overlying the other of said generally radially directed surfaces of said seal ring, and means are interposed between said flange and the other of said generally annular surfaces providing an essentially fluid tight seal therebetween.

3. In a face type rotary mechanical seal, a sealing member as claimed in claim 2, wherein said means providing an essentially fluid tight seal between said seal ring and said flange of said retainer comprises an "O" ring interposed between said flange and said other radially directed annular surface of said seal ring, said "O" ring urging said seal ring and the other of said annular surfaces of said seal ring into supporting contact with said generally radially directed annular support surface of said back-up ring.

4. In a face type rotary mechanical seal, a sealing member as claimed in claim 3, wherein said back-up member includes a generally annular relief at its outer peripheral surface receiving said generally cylindrical retainer, said retainer being disposed thereon in overlying relation to the outer peripheral surface of said seal ring, and means securing said retainer to said back-up ring, said securing means engaging said back-up ring and producing an axial force upon retainer urging said flange and said "O" ring toward said carbon sealing ring and urging said one of said annular surfaces thereof into supporting contact with said support surface of said rigid back-up ring.

5. In a face type rotary mechanical seal as claimed in claim 4, wherein said means securing said retainer to said back-up ring includes a plurality of screws threadedly engaged with said retainer and having tapered points at an end thereof said back-up ring defining a mating tapered groove for coaction with said points of said screws, rotation of said screws causing said points to engage with said mating tapered groove defined by said back-up ring causing said retainer to move in a direction to cause said flange of said retainer to urge said "O" ring seal against said annular surface of said carbon seal ring and said annular support surface thereof against said annular support surface of said back-up ring.

6. In a face type rotary mechanical seal for spacing a pressurized chamber, said seal having a pair of sealing members in relatively rotating sealing engagement, an annular sealing means comprising:
    (a) An annular sealing ring having a radially extending sealing surface on one side of said ring; an annular peripheral surface on the outside diameter of said ring and an inner annular surface on the inside diameter of said ring, one of said annular surfaces being exposed to atmospheric pressure, and the other being positioned within the chamber to be sealed;
    (b) means for precluding radial forces on said ring due to a differential pressure on the other annular surface, said means including an annular ring extending about said other annular surface and sealing means interposed on opposite sides of said annular ring and said other surface for sealing said other surface from pressure.

7. An apparatus as recited in claim 6 in which said sealing means includes elastomeric ring seals for sealing and isolating pressure of said chamber from said other annular surface.

8. In a face type rotary mechanical seal for sealing a rotating shaft within a housing and having a pair of sealing members in relatively rotating sealing engagement, an improvement comprising:
    (a) backing ring mounted within said housing and about said shaft;
    (b) an annular sealing ring formed of a carbon material having one side in engagement with said backing ring and the other side defining a sealing face for sealing engagement with the other sealing member;
    (c) said sealing ring having an outer peripheral surface and an inner annular surface one of which is exposed to atmospheric pressure and the other is provided with an annular pressure barrier;
    (d) said barrier being affixed to said backing ring, extending over said other surface and having a flange positioned parallel to said sealing face; and
    (e) an elastomeric seal interposed between said flange and said sealing surface for loading said sealing ring against said backing ring and for sealing said other surface from pressure.

* * * * *